United States Patent
Hammel et al.

(10) Patent No.: US 9,948,225 B2
(45) Date of Patent: Apr. 17, 2018

(54) DRIVE AND METHOD

(75) Inventors: Wolfgang Hammel, Bruchsal (DE); Thomas Schuster, Ottenbach (DE)

(73) Assignee: SEW-EURODRIVE GMBH & CO.KG, Bruchsal (DE)

( * ) Notice: Subject to any disclaimer, the term of this patent is extended or adjusted under 35 U.S.C. 154(b) by 421 days.

(21) Appl. No.: 12/376,116

(22) PCT Filed: Jun. 30, 2007

(86) PCT No.: PCT/EP2007/005813
§ 371 (c)(1),
(2), (4) Date: Feb. 2, 2009

(87) PCT Pub. No.: WO2008/014855
PCT Pub. Date: Feb. 7, 2008

(65) Prior Publication Data
US 2009/0322263 A1 Dec. 31, 2009

(30) Foreign Application Priority Data

Jul. 31, 2006 (DE) ........................ 10 2006 035 891

(51) Int. Cl.
*H02P 6/06* (2006.01)
*H02P 23/00* (2016.01)
*H02P 6/34* (2016.01)

(52) U.S. Cl.
CPC ............ *H02P 23/0077* (2013.01); *H02P 6/34* (2016.02); *H02P 23/0004* (2013.01)

(58) Field of Classification Search
USPC .............................. 318/400.06, 610, 400.02
See application file for complete search history.

(56) References Cited

U.S. PATENT DOCUMENTS

| 4,678,248 A | 7/1987 | Depenbrock |
|---|---|---|
| 5,459,386 A | 10/1995 | Okachi et al. |

(Continued)

FOREIGN PATENT DOCUMENTS

| DE | 199752 | 6/1907 |
|---|---|---|
| DE | 1 941 312 | 3/1971 |

(Continued)

OTHER PUBLICATIONS

International Bureau, Translation of International Preliminary Report on Patentability (including Written Opinion of the International Searching Authority), International Patent Application No. PCT/EP2007/005813, dated Feb. 17, 2009.

(Continued)

*Primary Examiner* — Jorge L Carrasquillo
(74) *Attorney, Agent, or Firm* — Andrews Kurth Kenyon LLP (57) ABSTRACT

A drive, including an electric motor, which is supplied by a rectifier, the rectifier including a time-discrete closed-loop control structure, which regulates the stator current of the electric motor by setting the voltage applied at the motor, the current of the motor being acquired in time-discrete fashion, the closed-loop control structure including a first closed-loop controller whose setpoint is the output value of a first non-linear transfer member, and whose actual value is the output value of a second non-linear transfer member, the input value of the first non-linear transfer member being the setpoint of a first current component of the current, the input value of the second non-linear transfer member being the actual value of a first current component of the current.

5 Claims, 6 Drawing Sheets

(56) References Cited

U.S. PATENT DOCUMENTS

| | | | |
|---|---|---|---|
| 5,654,624 A | 8/1997 | Schroderus | |
| 5,929,400 A * | 7/1999 | Colby | H02P 21/06 187/290 |
| 6,025,691 A * | 2/2000 | Kawabata | B60L 11/1803 318/700 |
| 6,335,605 B1 * | 1/2002 | Negoro | 318/727 |
| 6,469,916 B1 * | 10/2002 | Kerkman et al. | 363/41 |
| 6,630,809 B2 * | 10/2003 | Chen et al. | 318/804 |
| 7,102,309 B2 * | 9/2006 | Oh | F04C 28/28 318/255 |
| 7,103,425 B1 * | 9/2006 | Marra et al. | 700/78 |
| 7,187,152 B1 * | 3/2007 | Tsai | H02P 21/18 318/400.02 |
| 7,202,629 B2 * | 4/2007 | Jadot et al. | 318/812 |
| 7,315,157 B2 * | 1/2008 | Chapuis | 323/282 |
| 2003/0015988 A1 * | 1/2003 | Giuseppe | 318/727 |
| 2003/0205989 A1 * | 11/2003 | Garrigan et al. | 322/28 |
| 2004/0001291 A1 * | 1/2004 | Boeffel | 361/31 |
| 2005/0031140 A1 * | 2/2005 | Browning | 381/96 |
| 2005/0140329 A1 * | 6/2005 | Ihm | H02P 21/06 318/712 |
| 2006/0104451 A1 * | 5/2006 | Browning et al. | 381/59 |
| 2006/0192510 A1 * | 8/2006 | Okazaki et al. | 318/139 |
| 2007/0066155 A1 | 3/2007 | Schuster et al. | |
| 2007/0107973 A1 * | 5/2007 | Jiang et al. | 180/443 |

FOREIGN PATENT DOCUMENTS

| | | | |
|---|---|---|---|
| DE | 23 40 506 | | 2/1975 |
| DE | 27 21 459 | | 6/1978 |
| DE | 2721459 B | * | 7/1978 |
| DE | 31 49 402 | | 6/1983 |
| DE | 3149402 A1 | * | 6/1983 |
| DE | 41 15 338 | | 11/1992 |
| DE | 43 06 350 | | 4/1994 |
| DE | 195 32 477 | | 3/1996 |
| DE | 69 304 363 | | 2/1997 |
| DE | 199 19 752 | | 1/2001 |
| DE | 103 00 953 | | 7/2004 |
| DE | 10300953 A1 | * | 7/2004 |
| DE | 103 61 430 | | 7/2005 |
| EP | 0 179 356 | | 4/1986 |
| EP | 0 840 441 | | 5/1998 |
| GB | 1 481 535 | | 8/1977 |
| JP | H06-195104 A | | 7/1994 |
| JP | H09-238489 A | | 9/1997 |
| JP | H11-150996 A | | 6/1999 |
| JP | 2003-256003 A | | 9/2003 |

OTHER PUBLICATIONS

European Patent Office, International Search Report, International Patent Application No. PCT/EP2007/005813, dated Dec. 21, 2007.

* cited by examiner

DRIVE AND METHOD

FIELD OF THE INVENTION

The present invention relates to a drive and to a method.

BACKGROUND INFORMATION

EP 0 179 356 describes a method for controlling a polyphase machine. According to its FIG. 2, the current and the voltage are acquired at the motor. In the process, components of the actual value of the flow are formed from a closed-loop control structure that corresponds to a modeling of the machine. These are forwarded to a flow controller whose output controls the switching states of the inverter supplying the machine, in the form of actuating variables.

DE 1 941 312 describes a method for controlling an asynchronous machine, in which Hall-effect sensors are used.

DE 195 32 477 describes a method for starting an asynchronous machine, in which the value of zero is specified as the setpoint torque for the startup.

DE 199 752 describes a method for connecting a rectifier to an asynchronous motor.

SUMMARY

Example embodiments of the present invention provide for improving the control characteristics of an electric drive.

Example embodiments of the present invention provide a drive that includes an electric motor, which is supplied by a rectifier, the rectifier including a time-discrete closed-loop control structure, which regulates the stator current of the electric motor by setting the voltage applied at the motor, the current of the motor being acquired in time-discrete fashion, the closed-loop control structure including a first loop controller whose setpoint output value is the output value of a first non-linear transfer member, and whose actual value is the output value of a second non-linear transfer member, the input value of the first non-linear transfer member being the setpoint of a first current component of the current, the input value of the second non-linear transfer member being the actual value of a first current component of the current.

It may be provided that each non-linear transfer member is configured such that the worsening of the control characteristics by current dependencies of the motor parameters is able to be compensated. Deviations of the parameters due to saturation, in particular, are able to be compensated.

In example embodiments, the first and second non-linear transfer members are substantially identical. In this context it may be provided that the same physical variable, e.g., the current component of a current vector, may be used with the input values.

In example embodiments, the non-linear transfer member corresponds to a magnetization curve of the motor. It may be provided that the current dependency of the motor parameters is therefore invertible. It is particularly important, however, that the closed-loop control is implemented in time-discrete fashion.

In example embodiments, the non-linear transfer member has a transfer function in the form of $$\Phi(I) = \int_{i=0}^{I} L_{\text{diff}}(i)\, di,$$

I being the input variable of the member. In this context it may be provided that even with a time-discrete implementation and the large time steps used in the process, the changes in the inductivity as a result of the current changes induced during the time step are substantially taken into account.

In example embodiments, the non-linear transfer member is a transfer function, which a function, especially an integral, of the current-dependent inductivity function of the motor. In this context it may be provided that the output value of the member is able to be determined in a rapid and simple manner, i.e., with little computational work. It is possible to store a corresponding table, which makes it even faster and simpler to determine the output value.

In example embodiments, the closed-loop controller is a linear controller such as a P-controller, a PI-controller or a PID-controller. This provides that standard closed-loop controllers may be utilized. The time and effort involved in the production is therefore low.

In addition, a pilot control is able to be used.

In example embodiments, the current components are determined in a coordinate system from the acquired current. In this context it may be provided that the transformation into random systems is able to be realized. In an advantageous manner, a system is selected in which one of the current components is generating the flow and another is generating the torque.

In example embodiments, the rectifier includes a closed-loop control structure for each current component, which is substantially identical to the closed-loop control structure for the first current component. In this context it may be provided that the current components are treated uniformly.

Furthermore, the work involved in producing the closed-loop control software is minimal.

Important features of example embodiments of the present invention in the method are that the method is provided for the closed-loop control of the stator current in an electric motor supplied by a rectifier, the method being implemented in time-discrete fashion, and the stator current of the motor being recorded in time-discrete fashion, the setpoint of a first current component being the input value of a first non-linear transfer member whose output value is transmitted to a closed-loop controller as setpoint, the actual value of a first current component being the input value of a second non-linear transfer member whose output value is transmitted to the closed-loop controller as actual value, the actuating variable of the closed-loop controller being the voltage applied at the motor.

It may be provided that rectifier-supplied synchronous motor drives having high utilization such that the current affects the inductivity of the motor to a considerable extent exhibit excellent control characteristics.

The closed-loop control structure has a scalar configuration, in particular, i.e., for each current component independently of the closed-loop control structure of the other current component. However, depending on the coordinate system, the actuating variable of the stator voltage vector is a mixed or an independent actuating variable.

| LIST OF REFERENCE CHARACTERS | |
|---|---|
| I_setpoint | setpoint variable |
| I_actual | actual value |
| U | voltage as actuating variable |
| SR | current controller |
| SA | current sampling |

-continued

| LIST OF REFERENCE CHARACTERS | |
|---|---|
| R | closed-loop controller |
| M | motor |

Example embodiments of the present invention are explained in greater detail with reference to the figures.

DETAILED DESCRIPTION

Figure 1:
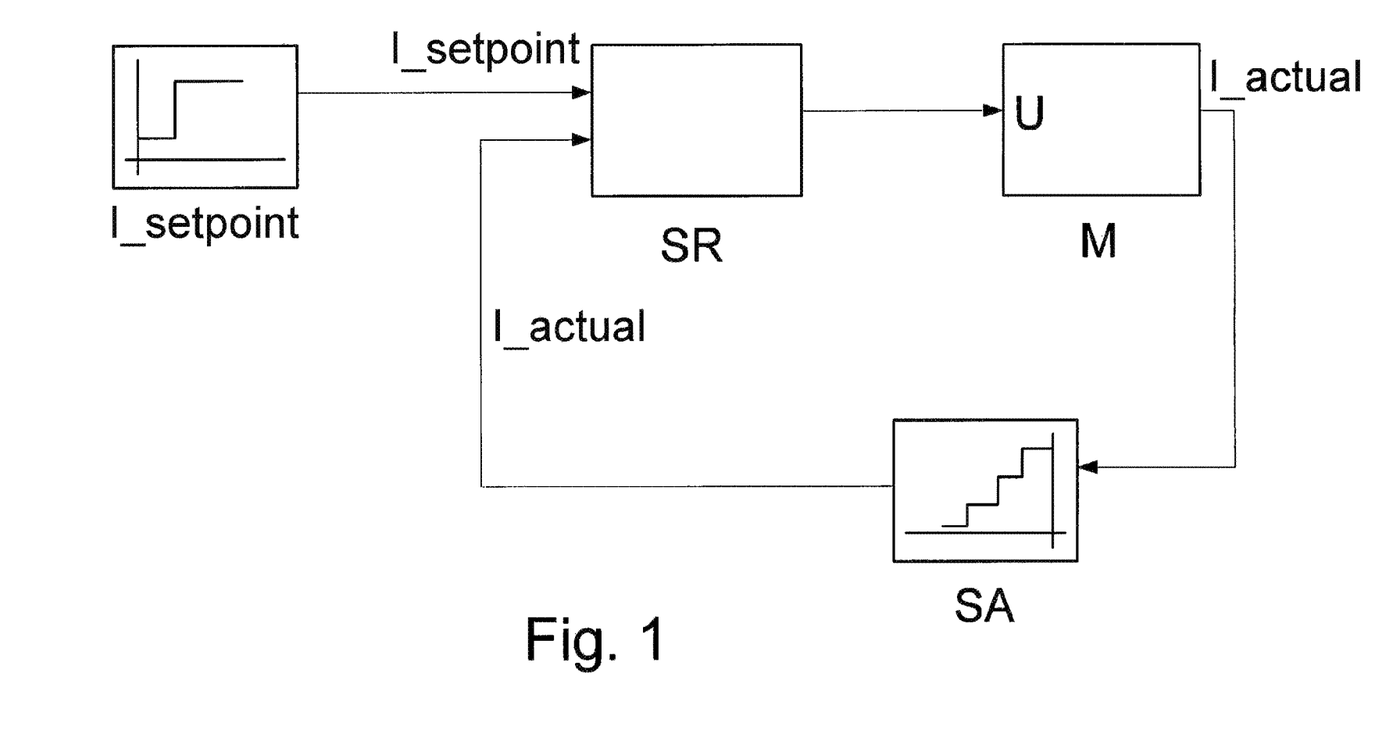
FIG. 1 illustrates a schematic closed-loop control structure.

FIG. 1 shows a schematic illustration of the closed-loop control structure. Actual current value I_actual is acquired at the machine, for instance an electric motor M. This acquisition is implemented in time-discrete manner, that is to say, once for each time step of the time-discrete closed-loop controller.

Since the current of the machine is a multi-dimensional variable if the machine has a three-phased supply, the current is to be represented as vector.

This vector is representable in a coordinate system, such as a flow coordinate system, rotor coordinate system, etc.

Actual current value I_ACTUAL of the figures is to be understood as current component in this coordinate system.

In the case of multiple current components, one closed-loop control structure is able to be used for each of these current components according to the figures. In any event, however, it is applicable to the torque-generating current component as I_ACTUAL, in particular.

Setpoint I_setpoint and actual value I_ACTUAL are forwarded to the closed-loop current controller, which modifies the actuating variable in accordance with the system deviation. In the case at hand, the voltage may be the mentioned actuating variable.

Figure 2:
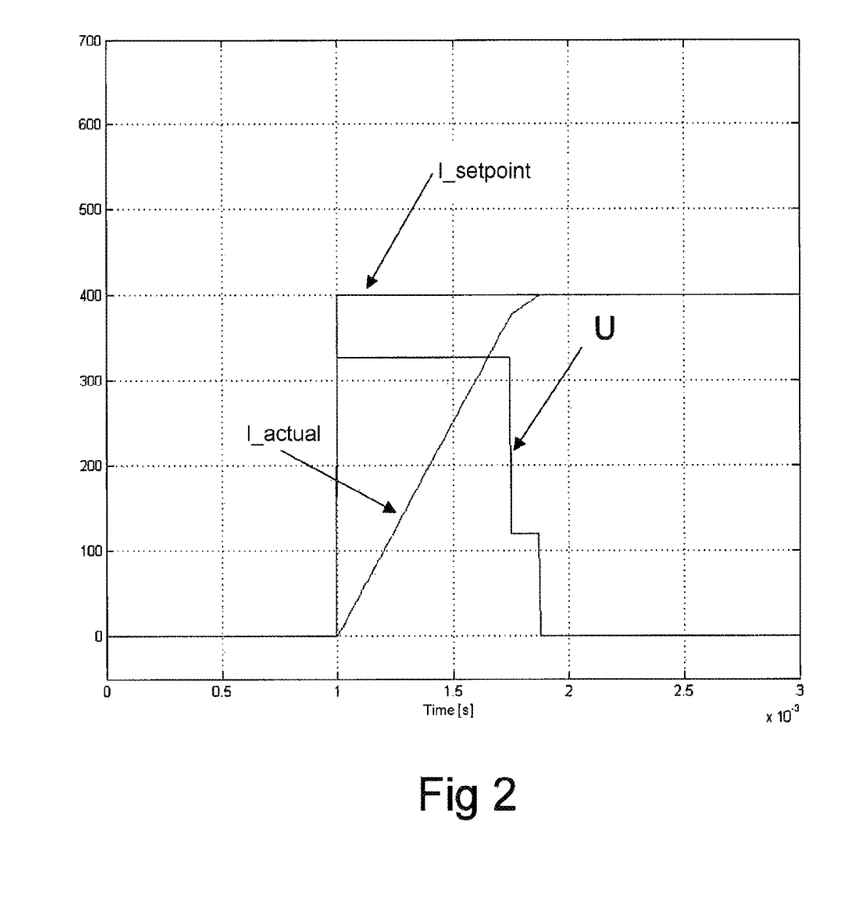
FIG. 2 illustrates curves of a setpoint value, an actual value, and an actuating variable.

FIG. 2 illustrates the curve of the setpoint value, an abrupt change being provided. In this case the actuating limit of the closed-loop controller is reached. As a result, multiple time steps of the time-discrete closed-loop controller are required until the adjustment of the actual value has been concluded. The adjustment is carried out as quickly as possible.

In this context it is assumed that the controlled system including machine M exhibits a linear and integrating response, such as, for instance, a current-independent inductivity.

Figure 3:
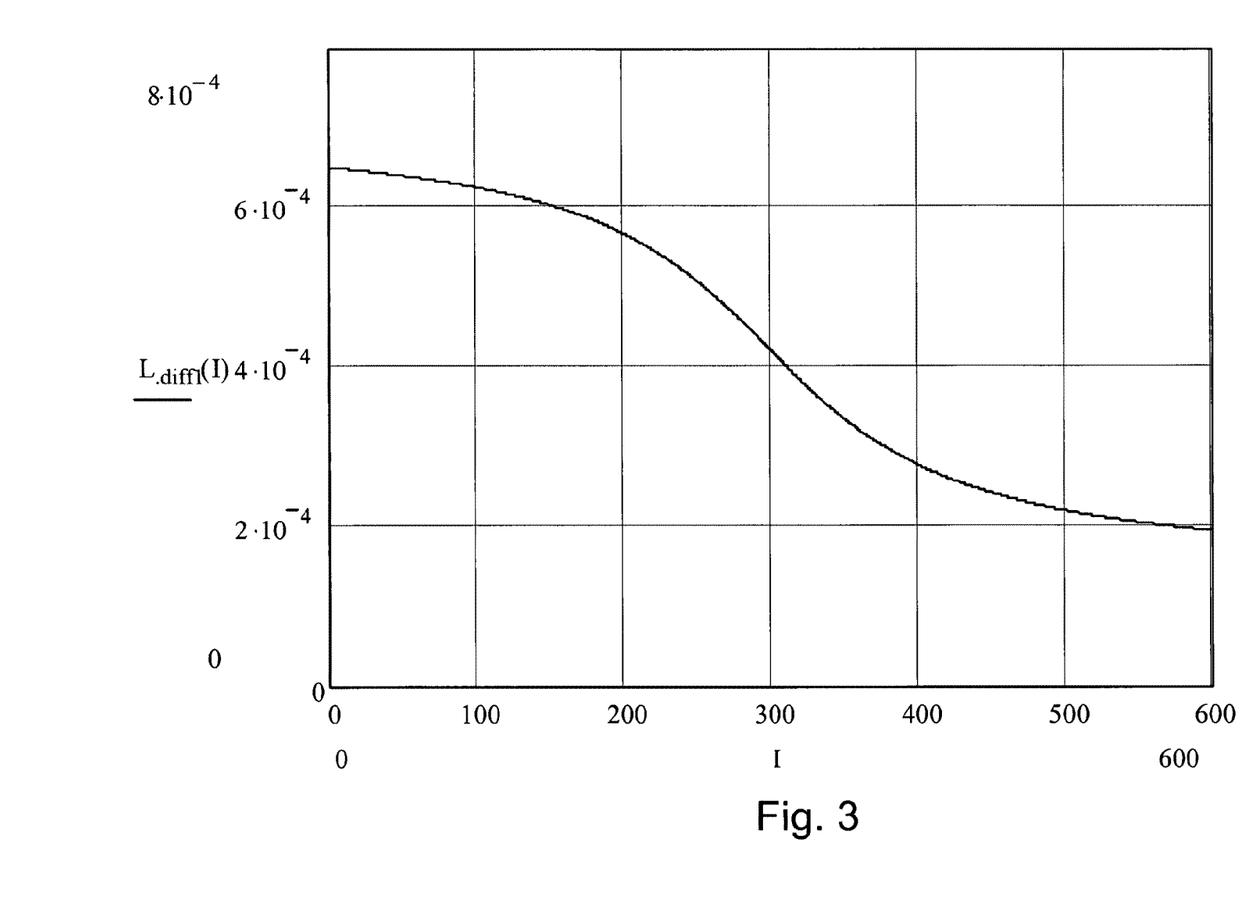
FIG. 3 illustrates a value of inductivity relative to a saturation limit.
Figure 4:
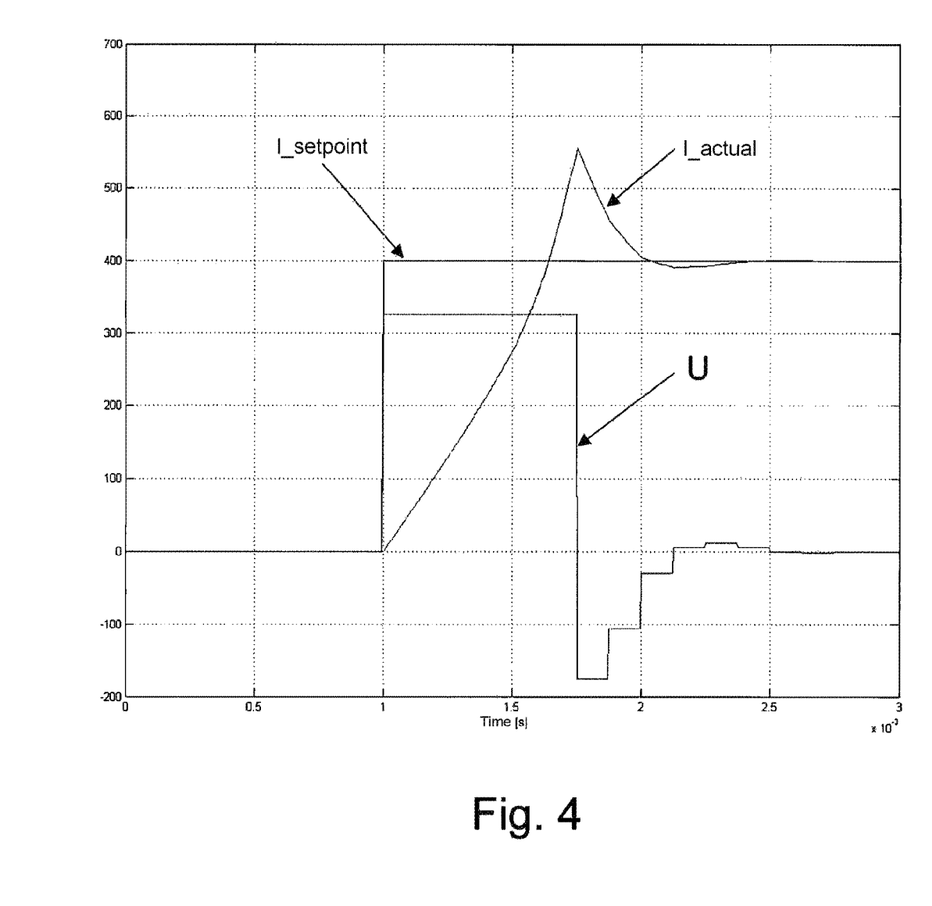
FIG. 4 illustrates curves of a setpoint value, an actual value, and an actuating variable.

However, if the inductivity is dependent on the current in the form shown in FIG. 3, then the curves according to FIG. 4 come about.

In FIG. 3 the value of the inductivity drops to less than one third once the saturation limit has been exceeded.

In FIG. 4, setpoint curve I_setpoint is implemented according to FIG. 2. Since the actuating limit for the voltage as actuating value is exceeded again, the actual value of the current once again requires a few time steps of the time-discrete closed-loop control until attaining the steady-state value. However, overswinging occurs in the process, which may exceed the current limit of the rectifier supplying the motor. This may then lead to an error and to a corresponding automatic switch-off of the rectifier.

Figure 5:
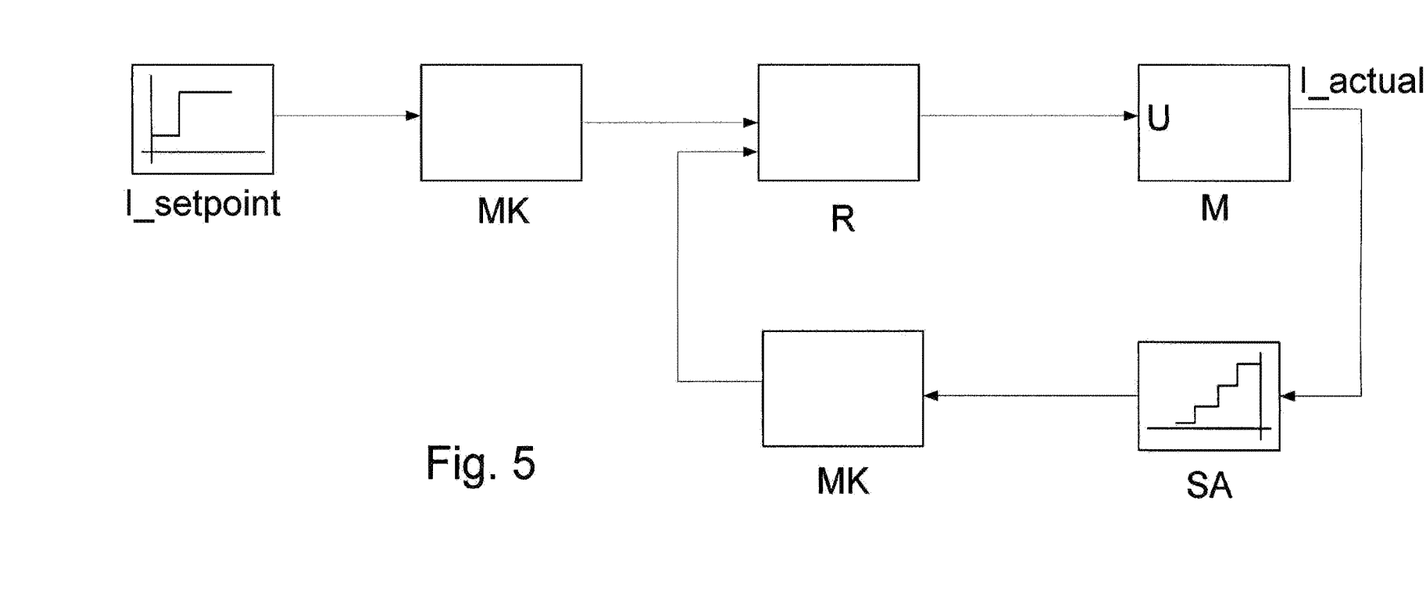
FIG. 5 illustrates a schematic closed-loop control structure according to an exemplary embodiment of the present invention.

In exemplary embodiments of the present invention, the current is acquired with the aid of the time-discrete current sampling according to FIG. 5, the current component of the current vector is determined and supplied to a non-linear transfer member MK. The setpoint I_setpoint is supplied to an identical non-linear transfer member MK.

The closed-loop controller then sets the voltage of the motor as a function of the system deviation.

Used as non-linear transfer member is $$\Phi(I) = \int_{i=0}^{I} L_{\mathit{diff}}(i)\,di,$$

I being the input value of the member, i.e., I_setpoint or I_actual, and $L_{\mathit{diff}}(i)$ describing the current dependency of the inductivity of the motor.

Thus, a scalar closed-loop controller is provided for the current component, in particular the torque-generating, which is able to be realized without involved computational operations, and as a consequence is implementable in the form of a rapid algorithm.

Figure 6:
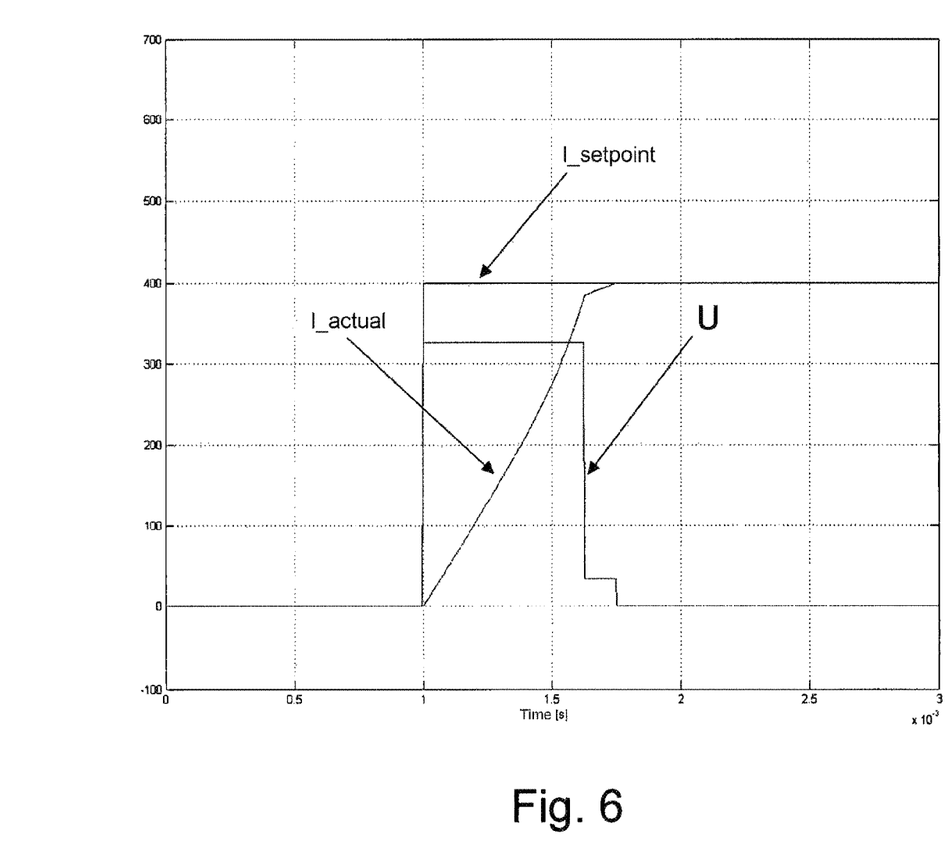
FIG. 6 illustrates curves of a setpoint value, an actual value, and an actuating variable according to an exemplary embodiment of the present invention.

In FIG. 6, setpoint curve I_setpoint has been implemented according to FIG. 2 again, the closed-loop controller according to FIG. 5 being used and a current dependency of the inductivity according to FIG. 3 being taken into account. Since the actuating limit for the voltage as actuating value is exceeded again, the actual value of the current once again requires a few time steps of the time-discrete closed-loop control until attaining the steady-state value. No overswinging occurs, although the steady-state value is reached within a very short period of time.

This closed-loop control may be used in synchronous motors that have a high degree of utilization and thus exhibit a heavily saturating behavior. But example embodiments of the present invention are also able to be used in other motors.

In further exemplary embodiments, it is possible to use at least the amount of the voltage vector of the supply of motor M as actuating variable for the voltage. However, as an alternative, the entire voltage vector also may be used as actuating variable.

The torque-generating component, in particular, is able to be provided as current component.

What is claimed is:
1. A drive, comprising:
    an electric motor;
    a rectifier adapted to supply a voltage to the motor, the rectifier adapted to regulate a stator current of the electric motor by setting the voltage applied at the motor based on a time-discrete closed-loop control structure, a current of the motor acquirable in time-discrete fashion, the rectifier including a closed-loop controller;
    a first non-linear transfer member adapted to receive, as an input value, a first current setpoint of a first current component of the current and adapted to generate an output value directly to the closed-loop controller as a second current setpoint; and a second non-linear transfer member adapted to receive, as an input value, an actual value of the first current component of the current and adapted to generate an output value directly to the closed-loop controller as an actual value;

wherein (i) at least one of the non-linear transfer members is adapted to generate the output value in accordance with (a) a magnetization curve of the motor and/or (b) a current-dependent inductivity of the motor and (ii) at least one of the non-linear transfer members has a transfer function in the form of $$\Phi(I) = \int_{i=0}^{I} L_{diff}(i)\, di$$

I being an input variable of the non-linear transfer member and $L_{diff}(i)$ corresponds to the current-dependent inductivity of the motor; and wherein the first and the second non-linear transfer members are identical.

2. The drive according to claim 1, wherein the closed-loop controller includes at least one of (a) a linear controller, (b) a P-controller, (c) a PI-controller, (d) a PID-controller; and (e) a controller with pilot control.

3. The drive according to claim 1, wherein a plurality of current components are determinable in a coordinate system from the acquired current.

4. The drive according to claim 3, further including a closed-loop control structure for each of the plurality of current components, which is similar to the closed-loop control structure for the first current component.

5. A method for regulating a motor current in an electric motor supplied by a rectifier, comprising:

acquiring a stator current of the motor in time-discrete fashion;

regulating the stator current of the motor;

wherein a first current setpoint of a first current component corresponds to an input value of a first non-linear transfer member whose output value is directly transmitted to a closed-loop controller as a second current setpoint, an actual value of the first current component corresponding to an input value of a second non-linear transfer member whose output value is directly transmitted to the closed-loop controller as an actual value, an actuating variable of the closed-loop controller corresponding to a voltage applied at the motor; and wherein the method is implemented in a time-discrete fashion; and wherein (i) at least one of the non-linear transfer members generates the output value in accordance with (a) a magnetization curve of the motor and/or (b) a current-dependent inductivity of the motor and (ii) at least one of the non-linear transfer members has a transfer function in the form of $$\Phi(I) = \int_{i=0}^{I} L_{diff}(i)\, di$$

I being an input variable of the non-linear transfer member and $L_{diff}(i)$ corresponds to the current-dependent inductivity of the motor; and wherein the first and the second non-linear transfer members are identical.

* * * * *